(12) United States Patent
Newbury et al.

(10) Patent No.: US 8,558,993 B2
(45) Date of Patent: Oct. 15, 2013

(54) OPTICAL FREQUENCY COMB-BASED COHERENT LIDAR

(75) Inventors: Nathan R. Newbury, Boulder, CO (US); Ian Coddington, Boulder, CO (US); William C. Swann, Boulder, CO (US)

(73) Assignees: The National Institute of Standards and Technology, as Presented by the Secretary of Commerce, Washington, DC (US); The United States of America as Represented by the Secretary of Commerce, Washington, DC (US)

( * ) Notice: Subject to any disclaimer, the term of this patent is extended or adjusted under 35 U.S.C. 154(b) by 401 days.

(21) Appl. No.: 12/883,491

(22) Filed: Sep. 16, 2010

(65) Prior Publication Data
US 2011/0285980 A1   Nov. 24, 2011

Related U.S. Application Data

(60) Provisional application No. 61/347,095, filed on May 21, 2010.

(51) Int. Cl.
*G01C 3/08* (2006.01)

(52) U.S. Cl.
USPC .......................................................... 356/4.1

(58) Field of Classification Search
USPC .................... 356/3, 4.09, 4.1, 5.03
See application file for complete search history.

(56) References Cited

U.S. PATENT DOCUMENTS

| | | |
|---|---|---|
| 5,164,784 A | 11/1992 | Waggoner |
| 5,164,823 A | 11/1992 | Keeler |
| 5,166,507 A | 11/1992 | Davis et al. |
| 5,198,657 A | 3/1993 | Trost et al. |
| 5,220,164 A | 6/1993 | Lieber et al. |
| 5,231,401 A | 7/1993 | Kaman et al. |
| 5,231,480 A | 7/1993 | Ulich |
| 5,239,352 A | 8/1993 | Bissonette |
| 5,257,085 A | 10/1993 | Ulich et al. |
| 5,270,780 A | 12/1993 | Moran et al. |
| 5,270,929 A | 12/1993 | Paulson et al. |
| 5,303,084 A | 4/1994 | Pflibsen et al. |
| 5,450,125 A | 9/1995 | Ulich et al. |

(Continued)

OTHER PUBLICATIONS

Jones, D.J. et al. "Carrier-envelope phase control of femtosecond mode-locked lasers and direct optical frequency syntheses" Scient 288, 635-9 (2000).

(Continued)

*Primary Examiner* — Tarifur Chowdhury
*Assistant Examiner* — Jonathan Hasen
(74) *Attorney, Agent, or Firm* — Carlson, Gaskey & Olds, P.C.

(57) ABSTRACT

A coherent laser radar that uses two coherent femtosecond fiber lasers to perform absolute ranging at long distance. One coherent femtosecond fiber lasers acts as a source and the other as a local oscillator for heterodyne detection of the return signal from a cooperative target. The system simultaneously returns a time-of-flight range measurement for coarse ranging and an interferometric range measurement for fine ranging which is insensitive to spurious reflections that can cause systematic errors. The range is measured with at least 3 μm precision in 200 μs and 5 nm precision in 60 ms over a 1.5 m ambiguity range. This ambiguity range can be extended to 30 km through reversal of signal and LO source roles.

13 Claims, 7 Drawing Sheets

(56) References Cited

U.S. PATENT DOCUMENTS

| | | | |
|---|---|---|---|
| 5,724,125 | A | 3/1998 | Ames |
| 5,822,047 | A | 10/1998 | Contarino |
| 5,825,464 | A | 10/1998 | Feichtner |
| 5,831,724 | A | 11/1998 | Cordes |
| 5,847,815 | A | 12/1998 | Albouy et al. |
| 5,989,087 | A | 11/1999 | Cordes et al. |
| 6,147,747 | A | 11/2000 | Kavaya et al. |
| 6,396,577 | B1 | 5/2002 | Ramstack |
| 6,441,889 | B1 | 8/2002 | Patterson |
| 6,556,282 | B2 | 4/2003 | Jamieson et al. |
| 6,593,582 | B2 | 7/2003 | Lee et al. |
| 6,608,669 | B2 | 8/2003 | Holton |
| 6,608,677 | B1 | 8/2003 | Ray et al. |
| 6,619,406 | B1 | 9/2003 | Kacyra et al. |
| 6,634,600 | B2 | 10/2003 | Krawczyk et al. |
| 6,646,725 | B1 | 11/2003 | Eichinger et al. |
| 6,664,529 | B2 | 12/2003 | Pack et al. |
| 6,711,475 | B2 | 3/2004 | Murphy |
| 6,717,655 | B2 | 4/2004 | Cheng et al. |
| 6,781,683 | B2 | 8/2004 | Kacyra et al. |
| 6,836,285 | B1 | 12/2004 | Lubard et al. |
| 6,873,716 | B1 | 3/2005 | Bowker et al. |
| 6,963,354 | B1 | 11/2005 | Scheps |
| 7,010,339 | B2 | 3/2006 | Mullen et al. |
| 7,064,817 | B1 | 6/2006 | Schmitt et al. |
| 7,067,812 | B2 | 6/2006 | Gelbwachs |
| 7,130,028 | B2 | 10/2006 | Pain et al. |
| 7,164,468 | B2 | 1/2007 | Correia Da Silva Vilar et al. |
| 7,164,787 | B1 | 1/2007 | Nevis et al. |
| 7,164,788 | B1 | 1/2007 | Nevis et al. |
| 7,187,452 | B2 | 3/2007 | Jupp et al. |
| 7,203,339 | B1 | 4/2007 | Nevis et al. |
| 7,215,826 | B1 | 5/2007 | Nevis et al. |
| 7,227,625 | B2 | 6/2007 | Kobayashi et al. |
| 7,248,342 | B1 | 7/2007 | Degnan |
| 7,260,507 | B2 | 8/2007 | Kalayeh |
| 7,274,448 | B2 | 9/2007 | Babin et al. |
| 7,313,506 | B2 | 12/2007 | Kacyra et al. |
| 7,333,184 | B2 | 2/2008 | Kalaych |
| 7,339,670 | B2 | 3/2008 | Carrig et al. |
| 7,361,922 | B2 | 4/2008 | Kameyama et al. |
| 7,375,877 | B1 | 5/2008 | Di Teodoro et al. |
| 7,397,568 | B2 | 7/2008 | Bryce et al. |
| 7,411,196 | B2 | 8/2008 | Kalayeh |
| 7,417,717 | B2 | 8/2008 | Pack et al. |
| 7,428,041 | B2 | 9/2008 | Kallio |
| 7,440,084 | B2 | 10/2008 | Kane |
| 7,474,964 | B1 | 1/2009 | Welty et al. |
| 7,532,311 | B2 | 5/2009 | Henderson et al. |
| 7,583,364 | B1 | 9/2009 | Mayor et al. |
| 7,652,752 | B2 | 1/2010 | Fetzer et al. |
| 7,656,526 | B1 | 2/2010 | Spuler et al. |
| 7,675,619 | B2 | 3/2010 | Danehy et al. |
| 7,692,775 | B2 | 4/2010 | Treado et al. |
| 7,920,272 | B2 * | 4/2011 | Sebastian et al. ............ 356/486 |

OTHER PUBLICATIONS

Udem, T. Holzworth, R & Hansch, T.W. "Optical Frequency Metrology" Nature 416, 233-237 (2002).

Swann, W.C., et al. "Fiber-laser frequency combs with sub-hertz relative linewidths" Opt. Lett. 31, 3046-3048 (2006).

Coddington, I. et al. "Coherent optical link over hundreds of metres and hundreds of terahertz with subfemtosecond timing jitter" Nature Photonics 1, 283-287 (2007).

Coddington, L, Swann, W.C., Nenadovic, L. & Newbury, N.R. "Rapid Precise Absolute Distance Measurements nt Long Range" Nature Photonics to be published (2008).

Coddington, L, Swann, W.C. & Newbury, N.R., "Coherent linear optical sampling at over 15 bits" submitted (2009).

Albota, M.A., et al. "Three Dimensional imaging laser radar with a photon-counting avalanch photodiode array and microchip laser" Appl. Opt. 41, 7671-7678 (2002).

Schibli, T.R. et al. "Frequency metrology with a turnkey all-fiber system" Opt. Lett. 29, 2467-2469 (2004).

Cash, W., Shipley, A., Ostserman, S. & Joy M., Laboratory detection of X-ray fringes with a grazing-incidence interferometer. Nature 407, 160-162 (200).

White, N., X-ray astronomy—Imaging black holes, Nature 407, 146-147 (2000).

Gendreau, K. C., Cash, W. C., Shipley, A. F. & White, N., Maxim Pathfinder X-ray interferometry mission. Proc., SPIE-Int. Soc. Opt. Eng. 4851, 353-364(2003).

ESA. XEUS: X-ray evolving-universe spectroscopy, ESA CDF Study Report CDF-31(A), 1-237 (2004).

Fridlund, M., Future space mission to search for terrestrial planets, Spoace Sci. Rev. 135, 355-369 (2008).

Fridlund, C.V.M., Darwin—the infrared space interferometry mission, ESA Bulletin 103, <http://www.esa.int/esaupb/bulletin/bullet103/fridlunc103.pdf> 20-25 (2000).

Lawson, P.R. & Dooley, J.A., Technology plan for the terrestial planet finder interferometer, Publ. Jet Propulsion Laboratory 05-5, 1-149 (2005).

Coroller, H.L., Dejonghe, J., Arpesella, C., Vernet, D., & Labeyrie, A., Tests with a Carlina-type hypertelescope prototype, Aston. Astrophys, 426, 721-728 (2004).

Lemmerman, L. et al, Earth science vision: platform technology challenges, Scanning the present and resolving the future. Proc. IEEE 2001 International Geoscience and Remote Sensing Symposium (2001).

Turyshev, S.G. & Shao, M., Laser astrometric test of relatively: Science, technology and mission design. Int. J. Mod. Phys. D 16, 2191-2203 (2007).

Turyshev, S.G., Lane, B. Shao, M. & Girerd, A., A search for new physics with the BEACON mission. Preprint at <http://arxiv:0805.4033v1> (2008).

Estler, W.T., Edmundson, K. L., Peggs, G.N. & Parker, D., H., Large-scale metrology-an update, CIRP Ann. Manuf. Technol. 51, 587-609 (2002).

Bobroff, N., Recent advances in displacement measuring interferometry. Meas. Sci. Technol. 4, 907-926 (1993).

Nagano, S. et al., Displacement measuring technique for satelitte-to-satellite laser interferometer to determine Earth's gravity field. Meas. Sci. Technol. 15, 2406-2411. (2004).

Pierce, R., Leitch, J., Stephens, M., Bender P. & Nerem, R. Inter-satellite range monitoring using optical inteferometry. Appl. Opt. 47, 5007-5019 (2008).

Beck, S. M. et al, Synetic aperture imaging LADAR; laboratory demonstration and signal processing. Appl. Opt. 44, 7621-7629 (2005).

Lucke, R. L. Richard, L. J., Bashkansky, M., Reintjes, J & Fun, E.E., Synethic aperture ladar, Naval Research Laboratory, FR 7218-02-10,051 1-28 (2002).

Minoshima, K. & Matsumoto, H., High-accuracy measurement of 240-m distance in an optical tunnel by use of a compact femtosecond laser. Appl. Opt. 5512-5517 (2000).

Dandliker, R., Thalmann, R. & Prongue, D., Two-wavelength laser interferometry using superheterodyne detection. Opt. Lett. 13, 339-341 (1988).

Williams, C.C. & Wickramasinghe, H.K., Absolute optical ranging with 200-nm resolution. Opt. Lett. 14, 542-544 (1989).

Stone, J.A., Stejskal, A. & Howard L, Absolute interferometry with a 670-nm external cavity diode laser. Appl. Opt. 38, 5981-5994 (1999).

Yang, H. J. Deibel, J., Nyberg, S. & Riles, K, High-precision absolute distance and vibration measurement with frequency scanned interferometry. Appl. Opt. 44, 3937-3944 (2005).

Schuhler, N., Salvade, Y., Leveque, S. Dandliker, R & Holzwarth, R. Frequency-comb-referenced two wavelength source for absolute distance measurement. Opt. Lett. 31, 3101-3103 (2006).

Salvade, Y., Schuhler, N. Leveque, S & Le Floch, S. High-accuracy absolute distance measurement using frequency comb referenced multi-wavelength source. Appl. Opt. 47, 2715-2720 (2008).

Jin, J., Kim, Y.-J., Kim, Y & Kim, S.-W., Absolute length calibration of gauge blocks using optical comb of femtosecond pulse laser. Opt. Express 14, 5968-5974 (2006).

(56) References Cited

OTHER PUBLICATIONS

Fox, R. W., Washburn, B.R. Newbury, N. R. & Hollberg, L., Wavelength references for interferometry in air. Appl. Opt. 44, 7793-7801 (2005).

Lay, O. P. et al., MSTAR; a submicrometer, absolute metrology system. Opt. Lett. 28, 890-892 (2003).

Hansch, T. W., Nobel Lecture: Passion for precision, Rev. Mod. Phys. 78, 1297-1309 (2006).

Hall, J. L, Nobel Lecture: Defining and measuring optical frequencies, Rev. Mod. Phys. 78, 1279-1295 (2006).

Ye, J., Absolute measurement of long, arbitrary distance to less than an optical fringe, Opt. Lett. 29, 1153-1155 (2004).

Joo, K., -N, & Kim, S.-W, Absolute distance measurement by dispersive interferometry using a femotsecond pulse laser, Opt. Express 14, 5954-5960 (2006).

Swann, W. C. & Newbury, N. R., Frequency-resoloved coherent lidar using a femtosecond fiber laser. Opt. Lett. 31, 826-828 (2006).

Joo., K. N., Kim, Y. & Kim, S. W., Distance measurements by combined method based on a femtosecond pulse laser. Opt. Express 16, 19799-19806 (2008).

Newbury, N. R., Swann, W. C. & Coddington, I., Lidar with femtosecond fiber-laser frequency combs, 14th Coherent Laser Radar Conference (Snowmass, Colorado, 2007).

Keilmann, F., Gohle, C. & Holzwarth, R., Time-domain and mid-infrared frequency-comb spectrometer, Opt. Lett. 29, 1542-1544 (2004).

Schiller, S., Spectrometry with frequency combs. Opt. Lett. 27, 766-768 (2002).

Yasuui, T., Kabetani, Y., Saneyoshi, E., Yokoyama, S. & Araki, T., Terahertz frequency comb by multifrequency, high-resolution and terahertz spectroscopy, Appl. Phys. Lett. 88, 241104 (2006).

Coddington, I., Swann, W. C. & Newbury, N. R., Coherent multiheterodyne spectroscopy using stablized optical frequency combs. Phys. Rev. Lett. 100, 013902 (2008).

Schlatter, A, Zeller, S. C., Passcotta, R. & Keller, U., Simultaneous measurement of the phase noise on all optical modes of a mode-locked laser. Appl. Phys. B88, 385-391 (2007).

Giaccari, P., Deschenes, J.-D., Saucier, P., Genest, J. & Tremblay, P., Active Fourier-transform spectroscopy combining the direct RF beating of two fiber-based mod-locked lasers with a novel referencing method. Opt. Express 16, 4347-4365 (2008).

Dorrer, C., Kilper, D. C., Stuart, H. R., Raybon, G & Raymer, M. G., Linear optical smapling, IEEE Photon, Technol. Lett. 15, 1746-1748 (2003).

Dorrer, C., High speed measurements for optical telecommunication systems. IEEE J. Quantum Electron. 12, 843-858 (2006).

Ciddor, P.E. & Hill, R.J., Refractive index of air. 2, Group index. Appl. Opt. 38, 1663-1667 (1999).

Telle, H. R., Lipphardt, B. & Stenger, J, Kerr-lens, mode-locked lasers as transfer oscillators for optical frequency measurements. Appl. Phys B 74, 1-6 (2002).

Stenger, J., Schnatz, H. Tamm C. & Telle, H.R., Ultraprecise measurements of optical frequency ratios, Phys. Rev. Lett. 88, 073601 (2002).

Newbury, N. R. & Swann, W.C., Low-noise fiber laser frequency combs. J. Opt. Soc. Am B 24, 1756-1700 (2007).

Rosenband, T. et al., Frequency ratio of Al+ and Hg+ single-ion optical clocks; metrology at the 17th decimal place, Science 319, 1808-1812 (2008).

Hartl, I., Imshev, G., Fermann, M.E., Langrock, C. & Fejer, M. M., Integrated self-referenced frequency-comb laser based on a combination of fiber and waveguide technology, Opt. Express 13, 6490-6496 (2005).

Baumann, E. et al., A high-performance, vibration-immune fiber-laser frequency comb. Opt. Lett. 34, 638-640 (2009).

Koch, B. R., Fang. A. W., Cohen, O. & Bowers, J. E., Mode-locked silicon evanescent lasers. Opt. Express 15, 11225-11233 (2007).

* cited by examiner

1

OPTICAL FREQUENCY COMB-BASED COHERENT LIDAR

The present disclosure claims priority to U.S. Provisional Patent Application No. 61/347,095, filed May 21, 2010.

BACKGROUND

The present disclosure relates to a comb-based coherent LIDAR that provides a unique combination of precision, speed and large ambiguity range.

In intrasatellite ranging, and similarly in manufacturing applications, there are three critical parameters: precision/accuracy, ambiguity range and update rate. High precision is particularly important in maintaining the pointing during formation flying of satellites; for example, coherent combining of 1-m sub-apertures to form a synthetic aperture of 100-m diameter requires a relative pointing accuracy of less than ($\lambda$/100 m) rad for the sub-aperture on each satellite, which in turn requires distance measurements at the sub-aperture edges with less than $\lambda \times$(1 m/100 m) accuracy, or a few nanometers at optical wavelengths. The ambiguity range characterizes the measurement range window; longer distances are aliased back to within the ambiguity range. Larger ambiguity range requires less a priori distance knowledge. Finally, fast millisecond-scale update rates are needed for effective feedback.

Many of these requirements push or exceed the capabilities of current 'stand off' ranging technology. Generally speaking, laser ranging is the determination of the phase shift on a signal after traversing a given distance. Crudely, shorter-wavelength signals offer greater resolution, and longer wavelength signals offer greater ambiguity range. For instance, the widely used continuous-wave (c.w.) laser interferometer measures the phase of optical wavelengths to achieve sub-nanometer resolution. However, measurements are limited to relative range changes as the ambiguity range equals half the laser wavelength. Alternatively, laser radar (LIDAR) measures distance through pulsed or radio-frequency (rf)-modulated waveforms. For pulsed systems, the time-of-flight is measured These systems offer large ambiguity ranges but with ~50-100 µm resolution. Multiwavelength interferometry (MWI) combines measurements at several optical wavelengths, which effectively generates a longer 'synthetic wavelength', and therefore a reasonable ambiguity range while maintaining sub-wavelength resolution. However, these systems are vulnerable to systematic errors from spurious reflections, and extending the ambiguity range beyond a millimeter can require slow scanning. Nevertheless, with extensive care in minimizing spurious reflections, the MSTAR system has successfully used MWI for sub-micrometer ranging. Femtosecond optical frequency combs offer an intriguing solution to intrasatellite ranging. From the early work by Minoshima, combs have been incorporated into precision ranging systems using various approaches.

Although frequency combs are normally considered in the frequency domain where they produce a comb of well-defined, narrow linewidth optical frequency lines, these same sources can also be viewed in the time-domain where they produce a train of well-defined, coherent optical pulses. These optical pulses can be very short in duration, i.e. have a large bandwidth, and can be arranged to have a high carrier phase coherence with an underlying optical cw "clock" laser. They very much resemble a coherent RADAR pulse train, except that the carrier frequency is shifted up into the optical region and their bandwidth can be significantly larger. As a consequence, these sources are interesting for high-resolution coherent LIDAR systems.

One challenge of taking full advantage of these high-bandwidth, coherent sources in a coherent LIDAR system lies in effectively detecting the return signal. The optical pulses have very high bandwidth (i.e. THz or greater) and standard direct or heterodyne detection would require an equivalently large bandwidth receiver.

SUMMARY

A LIDAR system and method where a second coherent frequency comb is heterodyned against the return signal and effectively down-converts the full bandwidth of the return signal to baseband, where it can be detected by relatively low bandwidth detectors. In the frequency domain, this picture is equivalent to massively parallel heterodyne detection between the "teeth" of the signal and local oscillator (LO) frequency comb. In the time domain, it is equivalent to linear optical sampling. This technique allows measurement of absolute range with 1.5 meter ambiguity range to high precision by "handing over" an effective time-of-flight measurement to an interferometric measurement. The time-of-flight measurement provides 3 µm precision in 200 µs; with averaging the measurement dropped below a quarter wavelength after 60 ms at which time the interferometric range measurement gave 3 nm precision. Such a LIDAR system may be suitable for precision positioning of satellites in a coherent formation

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
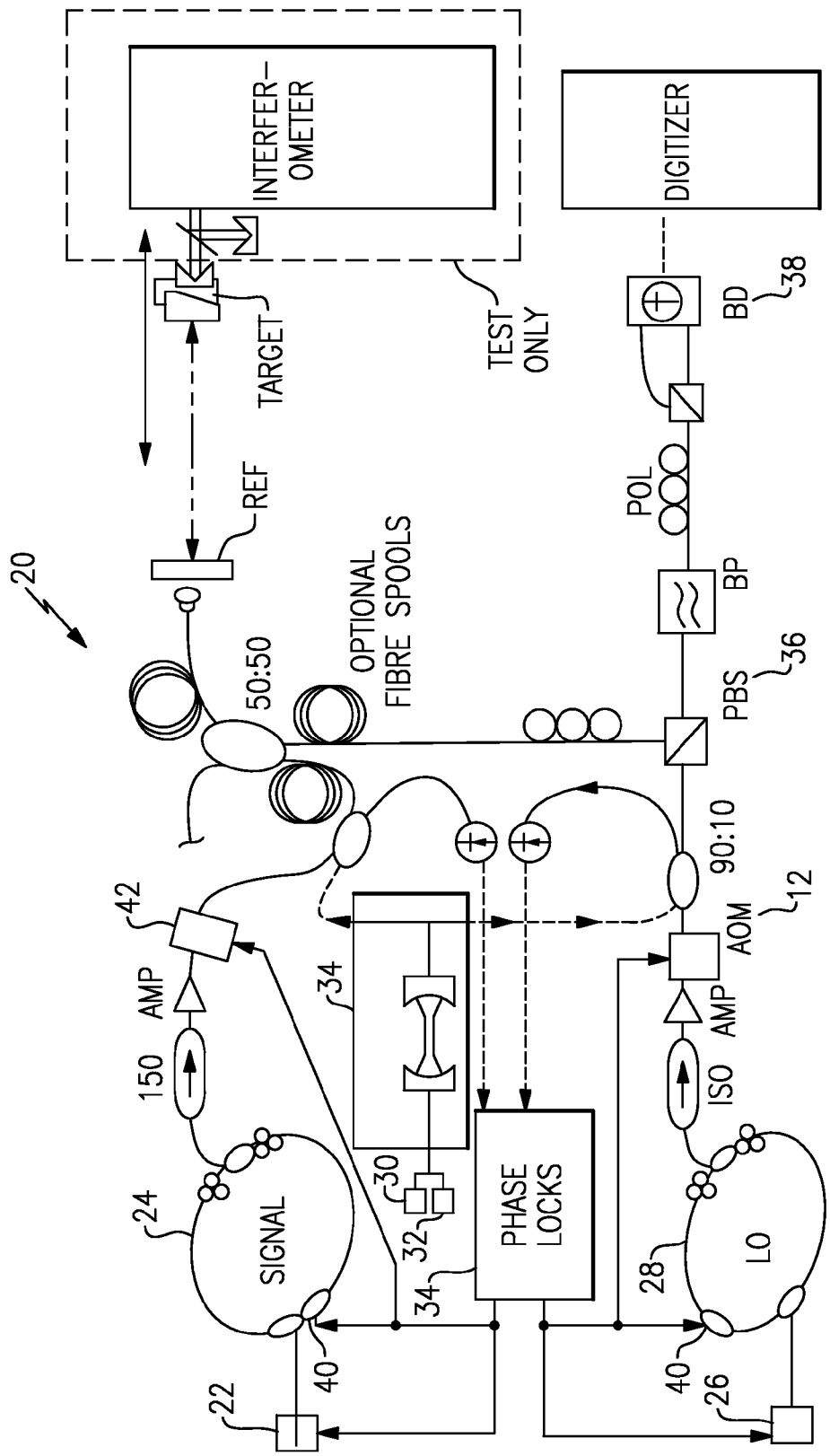
FIG. 1 is a general view that schematically illustrates a Light Detection and Ranging (LIDAR) system in an experimental set-up. Two erbium fibre frequency combs are each phase-locked to two c.w. reference lasers at 1,535 and 1,550 nm. The output of the frequency combs can be viewed in the time domain as a train of pulses or in the frequency domain as a regularly-spaced frequency comb. One fiber frequency comb acts as a signal frequency comb and one acts as a Local Oscillator (LO) frequency comb. The signal comb outputs a signal pulse train and the LO comb outputs an LO pulse train in time. For each laser an intercavity piezo-electric transducer and external acousto-optic modulator (AOM) provide modulation for one lock, and pump current modulation is sufficient for the second. A c.w. interferometer is used to monitor the relative target position only to provide truth data and is not part of the comb based measurement system. The signal pulse trains are combined with the LO on a polarizing beamsplitter (PBS), optically filtered with a 3-nm bandpass (BP) at 1,562 nm, directed to a balanced detector (BD), and finally digitized at 14 bits synchronously with the LO. The total detected signal power per reflection is approximately 0.4 mW, or 4 fJ per pulse. ISO, isolator; AMP, erbium fibre amplifier; POL, polarization control; 90:10 and 50:50 are splitter ratios. Optional (1.14-km) fibre spools are included in two configurations, matched pairs and bidirectional.
Figure 3:
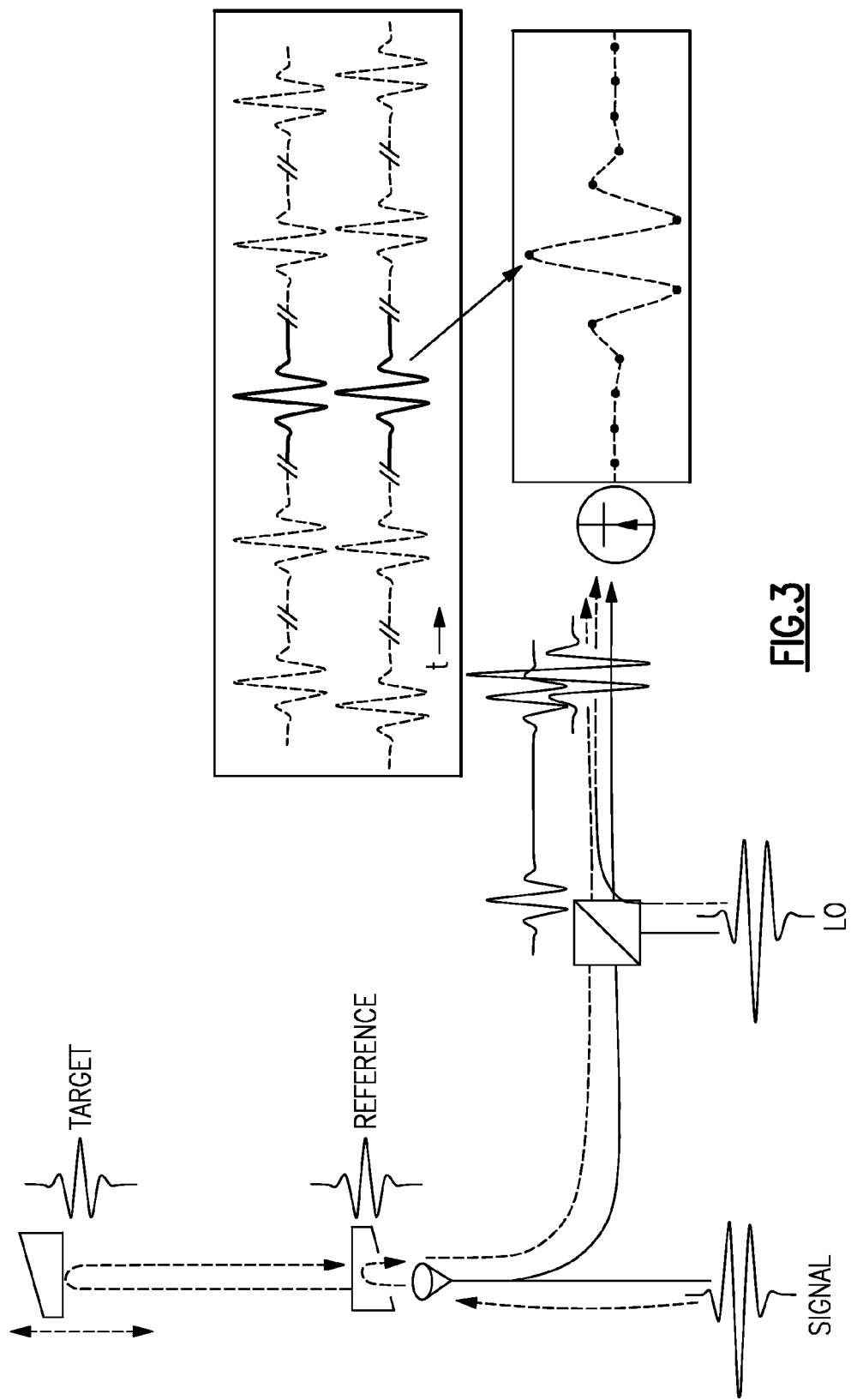
FIG. 3 schematically illustrates a Light Detection and Ranging (LIDAR) system.

FIG. 1 schematically illustrates a Light Detection and Ranging (LIDAR) system 20. The system 20 generally includes a first mode locked laser 24, also referred to as the signal comb, which transmits a signal pulse train reflected from a reference and a target (also illustrated in FIG. 3) and a second mode locked laser 28, also referred to as the LO comb, that generates a local oscillator (LO) pulse train. The combs can be phase locked to a first continuous wave laser 30 and a second continuous wave laser 32 that are themselves stabilized to an optical reference cavity 34. It should be understood that various laser types and systems may alternatively or additionally be provided. Furthermore, if only micrometer ranging is required (from the time-of-flight data), then the cw lasers need not be used to stabilize the optical carrier of the comb and the repetition rates can be monitored rather than phase-locked.

The pulsed nature of the comb is combined with the coherence of the carrier, allowing for a time-of-flight measurement simultaneously with an interferometric measurement based on carrier phase. This is implemented with the dual coherent frequency combs to achieve a nanometer level of precision with an ambiguity range of 1.5 m in 60 ms at low light levels and with high immunity to spurious reflections. The ambiguity range is readily extended to 30 km by reversing the role of the signal and LO combs 24, 28. The time-resolved signal also permits measurements between multiple reference planes in a single beam path. This host of features is unavailable in any other single system.

The combs 24, 28 may be of fiber ring laser design or other design. Signal pulse trains are combined with the LO pulse trains on a polarizing beamsplitter (PBS) 36, optically filtered with a 3-nm bandpass (BP) at 1,562 nm, directed to a balanced detector (BD) 38, then digitized. The total detected signal power per reflection is ~0.4 µW, or 4 fJ per pulse. ISO, isolator; AMP, erbium fibre amplifier; POL, polarization control; 90:10 and 50:50 are splitter ratios. Optional (1.14-km) fibre spools may be included in two configurations, in matched pairs and bidirectional.

The signal comb 24 and the LO comb 28 are each phase-locked to the two continuous wave reference lasers 30, 32 at, for example, 1,535 nm and 1,550 nm. Both cw lasers 30, 32 are stabilized to the same high-finesse optical reference cavity 34 via, for example, a Pound Dreyer Hall lock (PDH). The PDH may be implemented with fiber-optic components. With this approach, the optical reference cavity 34 effectively provides the overall timebase. If very high accuracy is needed, the frequency of the 1560 nm cavity-stabilized laser is measured by a fully self-referenced frequency comb (not shown) linked to a hydrogen maser. The two combs are phase-locked to the two cw reference lasers as described next. The lock setups for the two combs 24, 28 are essentially identical. The intercavity piezo-electric transducer (PZT) 40 and external acousto-optic modulator (AOM) 42 provide feedback for one lock, and feedback to the pump current 22, 26 is sufficient for the second. The comb light from each comb is combined with light from the stabilized cw lasers 30, 32, on the 90:10 splitter, with the 90% output directed to the target. The 10% port with the remaining comb light and the two cw lasers is spectrally separated on a 1 nm, 2-channel, grating filter and detected on two 100 MHz detectors. Each detector detects a beat signal between the comb and one cw laser.

The 1560 nm light stabilizes the comb carrier frequencies and the 1535 nm light stabilizes the comb repetition rates. Because optical bandwidth is relatively small compared to carrier frequency, the carrier stabilization lock may be the more critical of the two locks. For the carrier stabilization lock, the rf beat signal is divided by 8 to increase the capture range and then a digital phase lock loop (PLL) is used to lock the divided signal to a 10 MHz reference. The error signal is passed to a voltage controlled oscillator that drives the AOM and provides the high bandwidth (~100 kHz) feedback modulation. A second error signal is fed to an additional loop filter followed by a high voltage amplifier driving the intracavity PZT. This loop filter is tuned for high gain at DC and provides a slow, high dynamic range feedback. When locked, the integrated phase noise is <0.5 radians from 0.1 Hz-3 MHz.

The error signal for the lock at 1535 nm is generated using a mixer and tunable frequency synthesizer. The error signal is low pass filtered at 1.5 MHz and fed into a loop servo. The output of the loop servo is used to modulate the pump laser 22, 26 power to the combs. Our current feedback bandwidth is ~10 kHz limited by the laser dynamics combined with the erbium response. Although 10 kHz is sufficient, phase compensation could achieve still higher bandwidths.

Figure 2A:
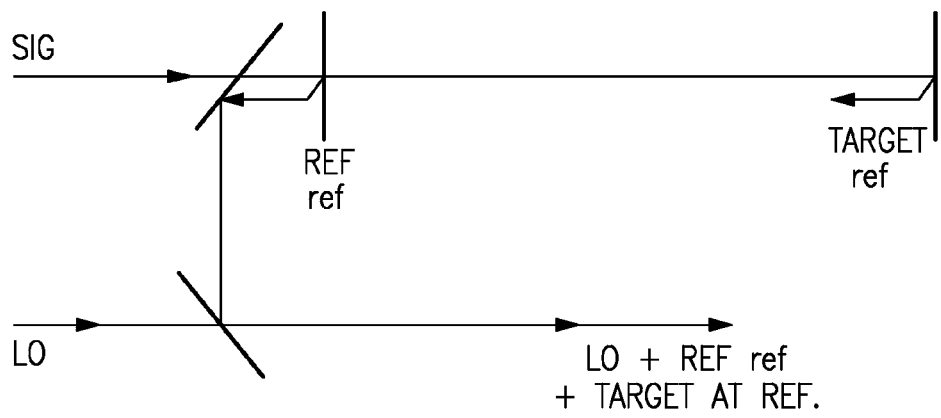
FIG. 2A is a schematic view of a high-repetition-rate 'signal' source which transmits pulses that are reflected from two partially reflecting planes (glass plates): the reference (r) and the target (t). The reference is a flat plate and yields two reflections, the first of which is ignored. Distance is measured as the time delay between the reflections from the back surface of the reference flat and the front of the target.
Figure 2B:
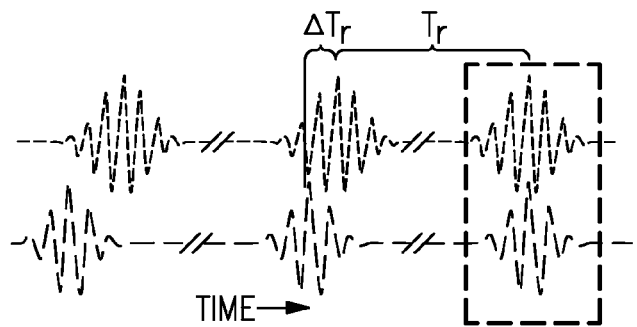
FIG. 2B shows the signal pulses detected through linear optical sampling against a local oscillator (LO). The LO generates pulses at a slightly different repetition rate. Every repetition period ($T_r$), the LO pulse 'slips' by $\Delta T_r$ relative to the signal pulses, and samples a slightly different portion of the signal. Consecutive samples of the overlap between the signal and LO yield a high-resolution measurement of the returning target and reference pulses.
Figure 2C:
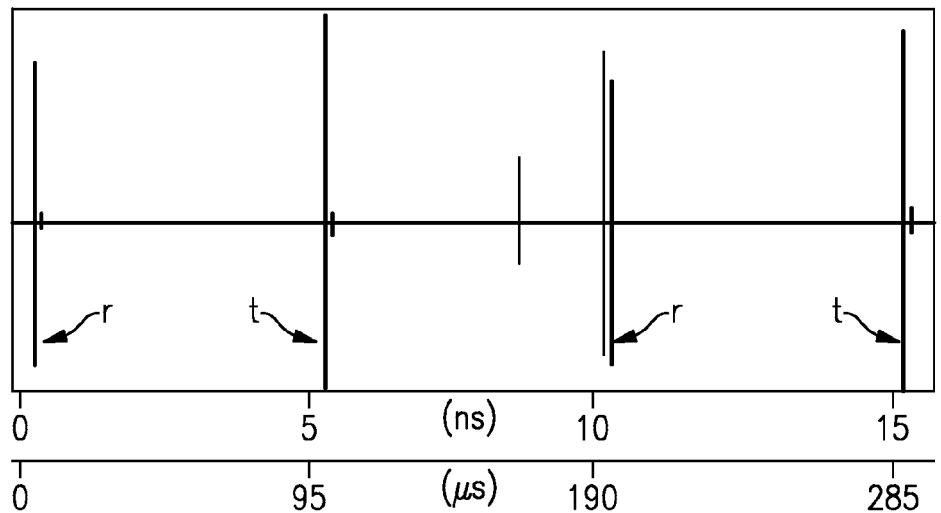
FIG. 2C is the measured voltage out of the detector in both real time (lower scale, 10 ns per data point) and effective time (upper scale, 500 fs per data point) for a target and reference plane separated by 0.76 m. A full 'scan of the LO pulse across the signal pulse is accomplished every ~200 microsec in real time and every ~10 ns in effective time. Two such scans are shown to illustrate the fast, repetitive nature of the measurement. Also seen are several spurious reflections of the launch optics.

With reference to FIGS. 2A-2C, the pair of stabilized femtosecond laser frequency combs 24, 28 have pulse trains of slightly different repetition periods ($T_r$ and $T_r - \Delta T_r$). The pulse train from the signal comb 24 serves as the 'signal' source and samples a distance path defined by reflections off the target and the reference (also schematically illustrated in FIG. 3). The pulse train from the LO comb 28 serves as a broadband local oscillator (LO), and recovers range information in an approach equivalent to linear optical sampling. That is, a heterodyne cross-correlation is provided between the signal and LO combs. The heterodyne detection provides shot-noise limited performance so that even weak return signals can be detected and the information in the carrier phase is retained. Measurements can be made with slow detectors and electronics (50-100 MHz) and are readily mapped back into the original femtosecond timescale.

An entire scan of the signal return, shown in FIG. 2C, is completed every $T_{update} = T_r^2/\Delta T_r$.

In one non-limiting embodiment, the combs 24, 28 operate at repetition rates of 100.021 and 100.016 MHz, giving $T_r \approx 10$ ns, $T_{update} = 1/5,190$ Hz $\approx 200$ μs and $\Delta T_r \approx 0.5$ ps. A 3-nm bandpass filter (BP; FIG. 1) limits the transmitted optical bandwidth to less than $1/(4\Delta T_r)$ in order to meet the Nyquist condition for sampling.

Given the digitized signal in FIG. 2C, the distance between target and reference reflections is calculated by the use of Fourier processing. Mathematically, the LO and signal electric field pulse trains are: $\Sigma_n e^{in\theta_{LO}} E_{LO}(t-nT_r)$ and $\Sigma_n e^{in\theta_S} E_S(t-n(T_r-\Delta T_r))$, respectively, where $E_{LO(S)}$ is the electric field of a single pulse, n is the pulse index and $\theta_{LO(S)}$ is the carrier-envelope offset phase.

For the nth pulse the detected voltage signal is proportional to the temporal overlap between the LO and delayed signal pulses, given by $V(t_{eff}) = \int E^*_{LO}(t)[E_s(t+t_{eff}-\tau_r) + e^{i\psi} E_s(t+t_{eff}-\tau_t)]dt$, where the effective time is $t_{eff} = n\Delta T_r$, $\psi$ accounts for the π differential phase shift upon reflection as well as the relative Gouy phase, $\tau_r$ and $\tau_t$ are the delays on the reference and target pulses, respectively, and we assume for simplicity that $\theta_{LO} = \theta_S$.

The relative delay $\tau = \tau_t - \tau_r$ between the target and reference reflection peaks in FIG. 2C, are time gated separate contributions to $V(t_{eff})$ from the reference and target(s) to find $V^r(t_{eff})$ and $V^t(t_{eff})$. The Fourier transforms of the two are related by $\tilde{V}^t(v) = e^{i\phi(v)+i\psi}\tilde{V}^r(v)$, with the relative spectral phase of $\phi(v)$ $= 2\pi\tau v$. Converting from τ to measured distance L, and including the dispersion of the air path, gives the relative spectral phase:

$$\phi(v) = 4\pi L/\lambda_c + (4\pi L/v_{group})(v - v_c) \quad (1)$$

where $v_c$ is the carrier frequency, $v_{group}$ is the group velocity at the carrier frequency, and $\lambda_c$ is the carrier wavelength, calculated at measured atmospheric conditions.

A linear fit $\phi = \phi_0 + b(v - v_c)$ gives the time-of-flight measurement through $L_{tof} = b(v_{group}/4\pi)$ and the high-precision interferometric distance measurement through $L_{int} = (\phi_0 + 2\pi m)(\lambda_c/4\pi)$. The 2πm ambiguity reflects the inherent $\lambda_c/2$ range ambiguity in any interferometric measurement. From equation (1), the system 20 is essentially an MWI with many simultaneously transmitted wavelengths (equal to the number of transmitted comb lines)

This approach is robust to systematic shifts for several reasons. First, the time gating eliminates shifts due to spurious reflections outside of the +30 ps (+4.5 mm) range window, which can be seen, for example, in FIG. 2C at 8.5 ns and shortly after the reference and target returns. In standard MWI, these spurious reflections are a significant systematic error, because the measured range is effectively a weighted average of all returns. (Either polarization multiplexing or physically separate beam paths are required for the target and reference in MWI.) Second, there are no assumptions about the particular pulse shape. Third, effects due to dispersion are apparent as deviations in the spectral phase, $\phi(v)$, from a linear slope. Fourth, strong self-consistency checks are possible through comparisons of the time-of-flight measurements centred at different carrier frequencies (by tuning the optical bandpass filter) and of the averaged time-of-flight and interferometric range measurements.

Figure 4:
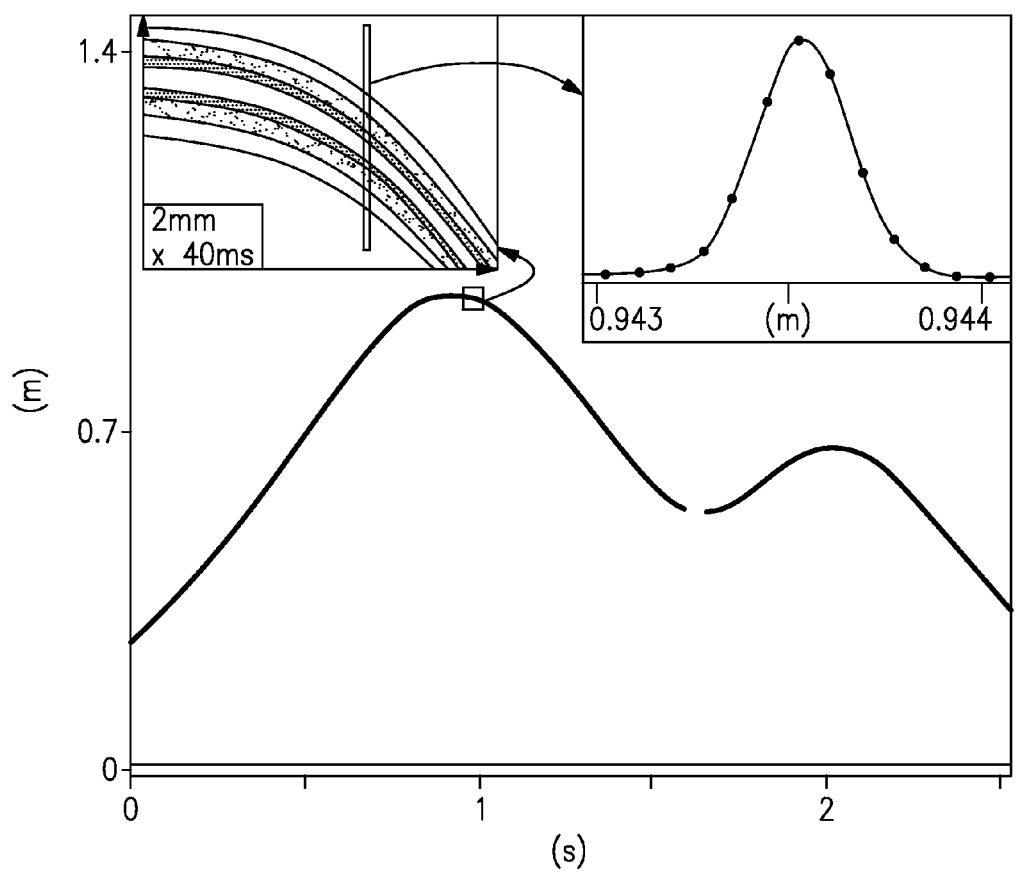
FIG. 4 is a real-time image of the range versus time for a moving target (shown in false colour). Every 200 microsec, the system scans the entire 1.5-m ambiguity range of the system. Sequential scans are stacked horizontally to yield an image tracking the target motion. The signal at zero distance is the reference plane, and the moving signal represents the target. The upper left inset shows an expanded. The upper right inset shows a cross-section of the return signal (magnitude squared of the detected electric field). The signal width is set by the 0.42 THz signal $1/e^2$ bandwidth.

Rapid update rates are important in applications such as formation flying or large-scale manufacturing, where the range information is used within a feedback system to orient the components. In one example, it takes 200 λs to scan a 1.5-m ambiguity range, and therefore it is possible to capture the motion of a moving target, as is shown in FIG. 4, where sequential 200 μs traces are placed side by side to map the position of the moving target.

Figure 5:
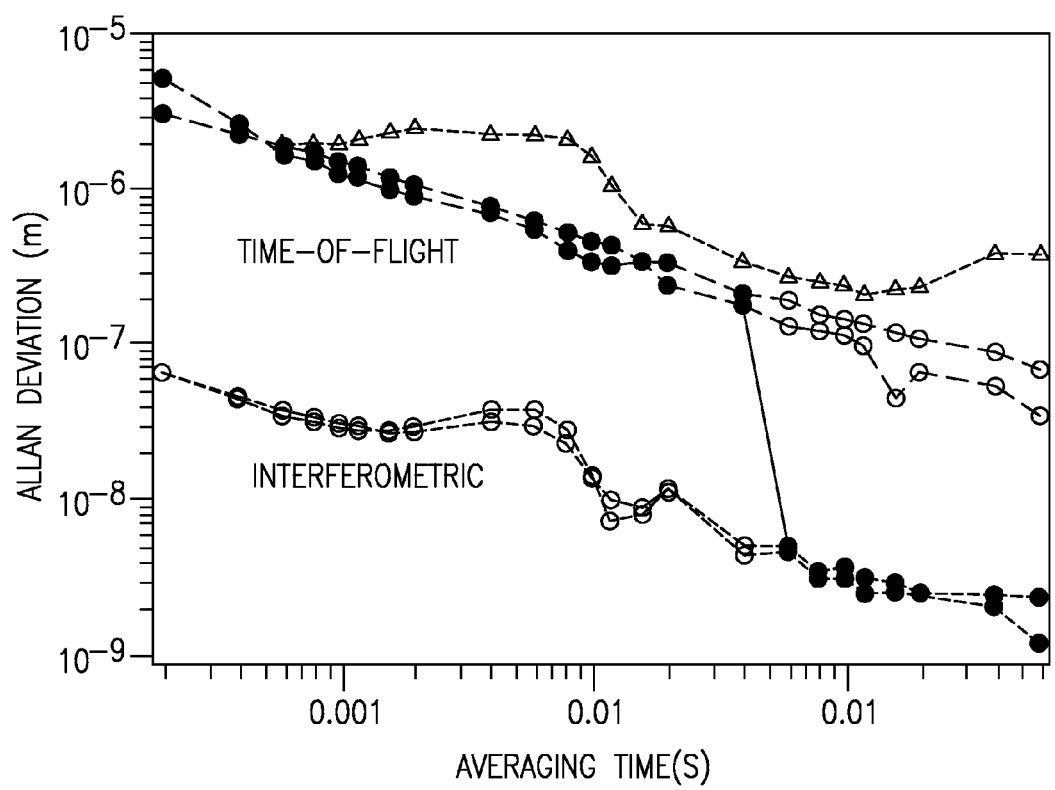
FIG. 5 shows the Allan deviation (precision) of the distance measurement versus averaging time. Three different measurements are shown: (i) an ~1 m reference-to-target distance without any fibre delay (lower black circles), (ii) an ~1 m reference-to-target distance with a 1.14-km fibre delay (upper black circles) and (iii) an ~1.14 km distance across a bidirectional fibre spool (triangles). The Allan deviation is evaluated over a 5-s data run that is composed of a series of individual data points at the 200 microsec update rate. For both reference-to-target distance measurements (with and without the fibre delay), both the time-of-flight and interferometric measurements are given. Solid circles show the experimental precision, which experiences a significant jump around 60 ms when the time-of-flight measurement is sufficiently stable compared to $\lambda_c/4$ and can be combined with the interferometric measurement. At shorter averaging times the interferometric data are still available, but provide only relative position information. For the 1.14-km distance measurement across the bidirectional fibre spool (red triangles), the precision of the time-of-flight distance is scaled to the group velocity of air. In this case, the uncertainty is dominated by actual length changes in the fibre and a 300-nm flicker floor from Rayleigh backscatter.

A Hilbert transform is used to show only the magnitude squared (intensity) of the detected signal. From the time-of-flight, the absolute distance between the reference and target can be determined to within 3 μm for each trace (FIG. 5). Note the dropout of information at ~1.6 s due to misalignment of the moving cart; for a standard c.w. interferometer with a range ambiguity of one wavelength, such a dropout would ruin the measurement, but here the system 20 readily reacquires the absolute range. A target that moves out of the ambiguity range is readily tracked with an unwrapping algorithm that should allow one to track an object moving as fast as 3,700 m s$^{-1}$.

High-Precision Absolute Distance Measurements Using Both Time-of-Flight and Interferometric Range Measurements.

For relatively slow moving targets below approximately 10 μm/s, the time-of-flight measurement can be averaged down sufficiently to hand over to the more precise interferometric range measurement, as described after equation (1). A series of experiments to demonstrate this capability by comparing the results to 'truth' data supplied by a standard fringe counting interferometric distance meter are described below.

In the first experiment, the reference-to-target distance at discrete steps over a ~1 m track was recorded. In satellite-to-satellite positioning the measurement could be at a range of a kilometer or longer. Two additional experiments with a fibre spool to extend the measurement range were also performed. Unlike space, optical fibre is nonlinear, dispersive, birefringent and backscatters the incident light. To counter nonlinearities, the outgoing signal pulse was chirped (necessary in any case for chirped-pulse amplification). To counter the dispersive effects, ~700 m of higher dispersion fibre was added at the output of the LO laser but within the phase-locked loop, so that the effective delay on the two comb outputs remained, but their relative dispersion was approximately equal at the detector. The most important remaining effect was Rayleigh backscatter from the outgoing pulse, because it cannot be time-gated from the signal. In one experiment, this was avoided by using two identical ~1.14-km spools—one for the outgoing and one for the return signal—and measured the reference-to-target distance at the end of the 1.14-km fibre delay. These data mimic those needed to make remote measurements of the pointing of a satellite, or the angle of a machined surface, through trilateration.

Figure 6:
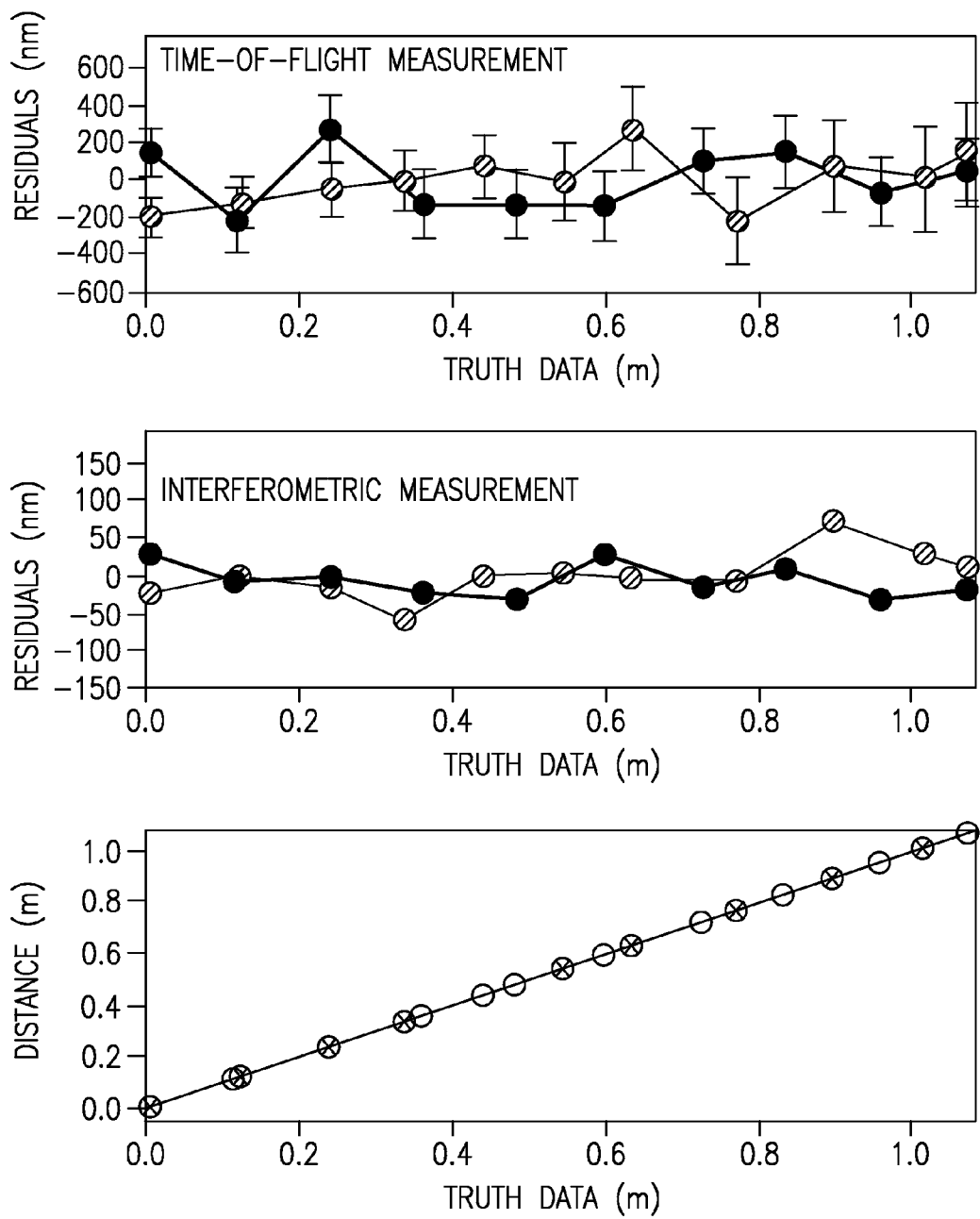
FIG. 6 are residuals of the measured time-of-flight and interferometric range measurements versus truth data from the commercial c.w. interferometer. The averaging period is 60 ms. Error bars are the standard deviation of the mean over the 60-ms period. Data taken with the fibre spool delay line are shown in black, and data without the spool are shown in crosshatch; as seen, the addition of the fibre delay has a negligible effect on the measurement. Although the interferometric data are much quieter, they become meaningful only when combined with the time-of-flight data to resolve the 780-nm range ambiguity.

With reference to FIG. 6, no difference in system performance was found for the reference-to-target distance measurements with and without the 1.14-km fibre delay. For test data and the truth data, the range was calculated for identical atmospheric conditions (air temperature, pressure and humidity) so that they shared a common $1\times10^{-7}$ uncertainty from variations in the atmospheric conditions. An independently measured 1 nm drift in the air path (due to temperature change) was subtracted out of the data. At 60 ms averaging, the statistical error on the time-offlight measurement was below 200 nm, with a systematic error evaluated at less than 100 nm. Because this uncertainty is below $\pm\lambda_c/2$, the distance measurement could be handed over to the interferometric range measurement, which had only a 20-30 nm scatter versus the truth data, consistent with the dominant uncertainty calculated from the estimated ~0.1° C. temperature variations between the two air paths.

FIG. 5 shows the precision of both the time-of-flight and interferometric measurements versus averaging time. Both with and without the fibre delay, the precision of the time-of-flight distance is $\sigma_{tof}=3$ μm $(T_{update}/T)^{1/2}$, where T is the averaging period. This scatter is about twice that expected from the measured white noise on the signal and results from ~20 fs residual timing jitter between the combs 24, 28. The precision of the interferometric distance is roughly $\sigma_{int}=100$ nm $(T_{update}/T)^{1/2}$, reaching 5 nm at 60 ms and continuing to drop below 3 nm at 0.5 s. It is limited by the residual carrier phase jitter between the pulse trains from the combs 24, 28. For both range measurements, tighter phase-locking or post-correction of the data from monitoring of the error signals will improve the precision.

In another experiment, the dual fibre spools were replace with a single, bidirectional spool and measured the delay between a reference reflection before the 1.14-km fibre spool and the target. The relative uncertainty, also shown in FIG. 5, is limited by Rayleigh backscattering, which gave rise to a 'flicker' noise floor of ~300 nm, which was too large to permit a confident 'handover' to the interferometric range measurement. At longer times, the uncertainty increases due to actual ~1 μm s$^{-1}$ fibre length changes from temperature effects. The comb repetition rate of $T_r^{-1}\approx100$ MHz sets the ambiguity range of our system to $R_A=T_r v_{group}/2=1.5$ m, adequate for most practical situations, but lower than the fibre delay, equivalent to 1.8 km of air. To remove this ambiguity, the roles of the signal and LO lasers were switched for use with the Vernier effect. Because of the difference in repetition rates, a distance measured normally and a second distance measured with the lasers switched differs by m$\Delta R_A$, where $\Delta R_A=\Delta T_r v_{group}/2$ is the difference in ambiguity ranges, and m is an integer giving the number of ambiguity ranges by which the true distance exceeds RA. Therefore, with the two measurements, m can be found and any ambiguity resolved up to the now larger ambiguity range of $v_{group}/(2\Delta f_r)=30$ km, where $\Delta f_r=(T_{update})^{-1}\approx5$ kHz is the difference in comb repetition rates. Applying this technique to the fibre spool, a fibre length of 1,139.2 m was measured in good agreement with a standard optical time-domain reflectometry measurement (using the same group index) of 1,138.4±1 m.

The limit to the fractional accuracy in the time-of-flight and interferometric range measurements is ultimately the fractional accuracy in the rf timebase and optical frequency, respectively. Here, an rf time base is provided by the hydrogen maser that can support better than $1\times10^{-13}$ fractional ranging resolution, that is, 3 nm in 30 km or below the systematic uncertainty. The fractional accuracy of the carrier frequency will depend on the underlying c.w. reference lasers, which can be stabilized to the calibrated reference cavity, a molecular reference, or a self-referenced frequency comb. (Here, the carrier frequency was stabilized to the previously described reference cavity 34, which had ~30 kHz wander as measured with a self-referenced frequency comb.) The fractional accuracy provided by the optical reference cavity 34 or molecular reference is sufficient for nanometer-scale measurements at short ranges, or for differential range measurements at long ranges. Nanometer scale absolute ranging at long distances requires a fully self-referenced comb, with the associated technical complexity. For extreme precision at very long ranges, the entire system may be based on an optical clock, to provide an increase of greater than $1\times10^4$ in accuracy, with effectively unlimited operation distances.

The data above illustrates the ability of this system 20 to measure the range between multiple reflections over a large range window (ambiguity range) at a short update rate and at long ranges. Equally important are the built-in checks on hidden systematics by comparing time-of-flight and interferometric range measurements. Although the detection and processing is straightforward, the technical challenge lies in the dual, coherent frequency comb sources, particularly for satellite applications. The comb source requirements here are simpler in two regards than those for the fully self-referenced octave-spanning combs needed to support current optical clocks. First, although the combs are phase-locked to hertz-level linewidths here, the absolute linewidth actually need only be below $\Delta f_r$ to cover the full 1.5-m ambiguity range. (Narrower linewidths are required only for extremely long-range operation beyond $v_{group}/\Delta f_r=30$ km.) Second, the comb output need only span 10-20 nm optical bandwidth rather than a full octave. The basic technique is not limited to fibre-based mode-locked lasers, and other passively mode-locked lasers may alternatively provide a more robust and compact system. Third, if only the time-of-flight data is needed, the optical carrier of the combs can be allowed to drift.

Figure 7:
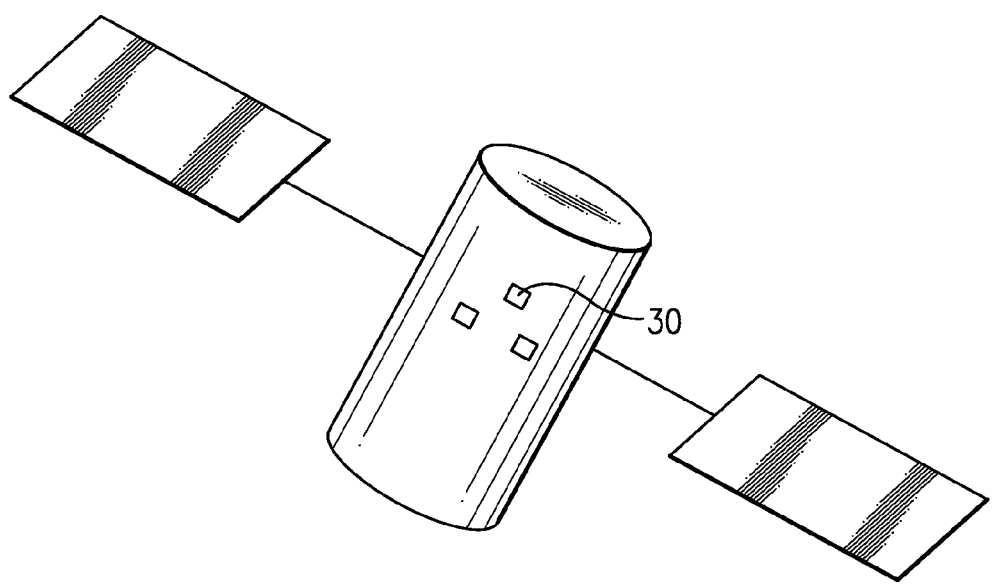
FIG. 7 is a schematic view of a satellite with multiple reference points such that a pitch and yaw of the satellite can be determined through trilateration, where the angle is calculated from the distance to several reference points spanning the target.

As stated earlier, for either large-scale manufacturing or formation flying, it is often the angle or pointing of the target that is most critical. The pitch and yaw of the object can be determined through trilateration, where the angle is calculated from the distance to several reference points 30 spanning the target (FIG. 7).

Multiple satellites flying in a precision formation can effectively act as a single distributed instrument and provide entirely new capabilities for space-based sciences. Formations would enable higher-resolution searches for extraterrestrial planets by providing a large synthetic aperture, enable direct imaging of a black hole by supporting an X-ray telescope distributed across satellites, or enable tests of general relativity through accurate measurements of satellite spacing in a gravitational field. The formation acts as a single instrument only if the relative spacing and pointing of the satellites is tightly maintained, which is made possible by comparing distance measurements between multiple reference points on the satellites and feeding back to the satellite position and pointing. This approach is well suited to carrying out this measurement, because the time gating of multiple reflections allows one to collect and process data for all trilateration reference points on the same photodiode and digitizer, saving both space and power. The wide ambiguity range and high update rate can support rapid reconfiguration of the target objects.

For active stabilization of absolute distances, or pointing angles, the time-of-flight measurement may beneficially be reduced to below $\lambda_c/4$ in a single scan so that interferometric precision could be reached in a single update time, $T_{update}$. The time-of-flight measurement uncertainty improves through increase in the signal pulse bandwidth up to the available ~4 THz source bandwidth (assuming a corresponding reduction in the residual comb jitter). However, the pulse bandwidth BW is constrained by the relationship $BW < T_{update}/2T_r^2$ (to achieve adequate sampling), so a larger bandwidth implies a lower update rate. This constraint can be removed by coherently combining multiple detection channels at different wavelength bands across the source. With this approach, nanometer-level precision is possible at less than a millisecond update rate.

The linear optical sampling arrangement is relatively straightforward, but contains a few technical subtleties. In the linear optical sampling picture, signal and LO pulses arrive at the detector at a rate of ~100 MHz and with varying delays between them. The signal and LO pulse overlap is integrated over the detector response time (~1/100 MHz) to yield a single voltage sample, which is then synchronously digitized at the LO repetition rate. Sampling is performed, for example, with a 110 MHz balanced detector that allows amplitude noise suppression in the relatively high power LO. To eliminate detector ringing effects, the signal is low-pass filtered at 50 MHz (which also eliminates any nonsensical signal above the Nyquist frequency set by the LO sampling rate). Once the signal and LO are combined on the same detector, the measurement is insensitive to electronic phase shifts as long as the system remains linear. Saturation of detectors and amplifiers is avoided.

For time-of-flight distance measurements with resolution smaller than 200 nm, a few pitfalls may arise. In virtual time, the LO samples the signal laser $T_r/\Delta T_r$=19,260 times per signal repetition period, $T_r$. This gives an effective sample step size of 78 μm. For ease in processing one might be tempted to set up the system so that after every 19,260 samples the signal and the LO have the same phase, however, systematics related to the pulse shape limit ability to measure the centre of peaks below a precision of 300 nm with a 78-1 μm step size. Instead, the phase locks are arranged so that the pulses overlap every 19,260×51 samples. Averaging sequential frames then effectively subdivision of the 78-μm step size by 51, which is sufficient to achieve sub-100-nm resolution. It was also found that the use of interleaved ADCs (analog-to-digital converters) in the digitizer may lead to scatter in the data.

For the interferometric measurement, the phase factor ψ, is defined herein as $\psi=\pi+\phi_{Gouy}$. The factor π arises from the reflection from the air-glass interface at the target. The reference pulse occurs from a glass-air interface and suffers no such phase shift. The Gouy phase shift is dependent on the actual distance and we use a separate measurement of the beam Rayleigh range to calculate this phase shift from the time-of-flight distance data.

In an experiment, the processing is not performed in real time. Rather, the raw data is collected and post-processed. The processing is done on a 'scan-by-scan' basis. The 19,260 data points from each ~200-μs-long scan are first high-pass-filtered at 5 MHz and then searched for the three largest peaks, the first two of which are from the front and back surfaces of the reference flat and the last one from the target. Two copies of the data are then generated: one with a 60-ps time window (the exact width is not important) around the appropriate reference reflection and one with a 60-ps time window about the target reflection. The 19,260 data points are truncated to a length that has only low numbers in its prime factorization (for example, 19,200) and fast Fourier transformed (FFT). The spectral phase is extracted from the FFT and fit across ~0.4 THz of bandwidth to equation (1) and further processed as described in the text. The most computationally intensive operation is the FFT, and real-time processing of the data should be possible with modern field programmable gate arrays.

As with any ranging LIDAR system, the achievable distance resolution, ΔR, is $$\Delta R \sim \frac{c}{2 \times BW \times SNR} \tag{0.1}$$

where c is the speed of light, BW is the transmitted optical bandwidth, and SNR is the signal-to-noise ratio. For absolute ranging, there are also contributing systematic errors. This equation applies to time-of-flight pulse measurement, where the BW is inversely proportional to pulse width, and reflects how well one can estimate the pulse center. It also applies to the interferometric measurement provided the BW is replaced by the carrier optical frequency, ν, and the SNR by the fractional pulse-to-pulse phase noise δφ/(2π). In our system, a "single" measurement takes an update time $t_{update}$=1/$\Delta f_r$ which is the time for the LO comb to fully sweep across the signal comb.

In this case, there is a tradeoff between bandwidth and update rate, $$BW < t_{update} \frac{f_r^2}{4} = t_{update} \frac{c^2}{16R_A^2} \tag{0.2}$$

where $f_r$ is the repetition rate, and $R_A=c/(2f_r)$ is the ambiguity range. This equation can be derived in the time domain by requiring the LO pulse never "misses" the signal pulse or in the frequency domain by requiring there is never any aliasing of multiple optical heterodyne beats onto a single rf beat (See FIG. 1). Assuming the SNR is close to shot-noise limited at SNR~$\eta\sqrt{P_{return}/f_r}$, where $P_{return}$ is the total detected return power and η is the detector responsivity, then Eq. (0.1) and (0.2) yield a "figure-of-merit", $$\Delta R \times t_{update} \sim \frac{2c}{\eta\sqrt{P_{return}}} f_r^{-3/2}, \tag{0.3}$$

i.e. the product of resolution and update rate, which we would like to be as small as possible. The overall performance improves dramatically with increasing repetition rate, at the cost of a lower ambiguity range.

The source bandwidth typically far exceeds the detection bandwidth, BW. Therefore, multiple detectors can be utilized to take advantage of the full available bandwidth as a linear array of photodetectors may be used after the grating-based (or other) spectral filter to detect multiple spectral bands at once. In that case, Eq. (0.1) has an extra factor of 1/M, where M is the number of detectors (or spectral channels, each with bandwidth BW that satisfies Eq. (0.2)) and the SNR per channel is modified to SNR~$\eta\sqrt{P_{return}/Mf_r}$ to yield, $$\Delta R \times \tau_{update} \sim \frac{2c}{\eta\sqrt{P_{return}}\sqrt{M}} f_r^{-3/2} \qquad (0.4)$$

Once $\Delta R$ has dropped below a quarter wavelength, then the interferometric data provides much more precise ranging. In practice, the resolution of (0.4) is reached only if the systematics are sufficiently low, which requires either active locking of the two combs, or, alternatively, accurate monitoring of their relative coherence and a software correction.

The nm-scale ranging that is possible with the combs is excessive for many terrestrial applications. However, the system is flexible in terms of trading off precision for speed, as indicated in Eq. (0.1) to (0.4). While these scaling laws relate to the measurement of a single range, the system can also be configured so that the M channels each measure the range to a different point on the surface. In that case, the same basic scaling of (0.3) applies to each channel independently, and $P_{return}$ is the power per measurement point. Each channel retains the ability to "handover" the time-of-flight range measurement to an interferometric measurement with nm-level precision. This ability to measure the absolute range at nm-level precision and with reasonable (cm to meter) ambiguity range is a feature not easily found in current 3D laser radar systems. Such a system would provide much higher potential range resolution than current Geiger-mode APD based 3D imaging systems although it would require significantly more return power and would therefore only be suitable at shorter distances and when such increased range resolution is warranted.

The disclosed non-limiting embodiment provides ranging application of a dual-comb coherent LIDAR system. However, the coherent LIDAR can alternatively operate as a high-resolution vibrometer as well. In fact, the broad comb bandwidth lends itself to spectral averaging to reduce the limiting effects of speckle on high-resolution vibrometry signals. The use of dual combs relaxes the significant range restriction of the previous comb-based vibrometer, and one could conceivably configure the system to loosely lock onto a target for high-resolution vibrometry data, although such a system would require more complete control of the combs than demonstrated here. Another potential application of coherent frequency combs is in the area of synthetic aperture LIDAR particularly given the analogy of this source to a coherent pulsed RADAR source.

The highly coherent frequency combs have the potential to provide very high resolution coherent LIDAR systems for ranging and vibrometry, as well as a host of other applications including synthetic aperture LIDAR and multispectral LIDAR. To fully exploit their broad bandwidth does require an increase in transmit power over a single wavelength system but the dual-comb system here is completely compatible with chirped pulse amplification. Unlike "metrology-grade" frequency combs, the sources here are considerably simpler since they do not require a full octave of output bandwidth. Nevertheless, more work is required to either further improve the robustness of fiber-based combs or alternatively, to base these systems on other types of compact and robust mode-locked lasers.

The frequency comb based LIDAR disclosed herein offers a host of powerful features—precision, stability, speed, large-range ambiguity, low light level operation, multiplexing capabilities, flexibility and spurious reflection immunity—that, as a whole, are unavailable in existing approaches.

It should be understood that relative positional terms such as "forward," "aft," "upper," "lower," "above," "below," and the like are with reference to the normal operational attitude of the vehicle and should not be considered otherwise limiting.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A method of comb-based coherent Light Detection and Ranging (LIDAR) comprising:

generating a signal comb that transmits a signal pulse train reflected from a reference and a target to generate a target signal from the target and a reference signal from the reference;

generating a local oscillator (LO) comb that transmits a LO pulse train at a slightly different repetition rate than the signal pulse train with a coherent optical carrier;

detecting the reflected signal pulse train through linear optical sampling against the LO pulse train in which consecutive samples of an overlap between a signal pulse from the target signal and the references signal, and a LO pulse from the LO pulse train yields a high-resolution measurement of the target signal and reference signal;

Fourier transforming the target signal to extract the optical phase vs. frequency of the target signal;

Fourier transforming the reference signal to extract the optical phase vs. frequency of the reference signal;

determining a frequency dependant optical phase difference between the optical phase of the target signal and the optical phase of the reference signal;

fitting the optical phase difference to a straight line;

obtaining a time-of-flight distance measurement from a slope of the straight light and the known group velocity of light at the frequency of the coherent optical carrier;

obtaining an interferometric distance measurement between the target and the reference from an intercept of the straight line and the wavelength of the coherent optical carrier.

2. A method as recited in claim 1, wherein the time-of-flight measurement is repeated and averaged until a desired uncertainty of the time-of-flight distance measurement is achieved.

3. A method as recited in claim 1, wherein the time-of-flight measurement is repeated until an uncertainty of the time-of-flight distance measurement is below half the wavelength of optical carrier.

4. A method as recited in claim 3, wherein the time-of-flight measurement is repeated to remove an ambiguity of the interferometric distance measurement.

5. A method as recited in claim 1, wherein generating the signal comb that transmits the signal pulse train reflected from the reference and the target with a first mode locked laser.

6. A method as recited in claim 5, wherein generating the local oscillator (LO) comb that transmits the LO pulse train with a second mode locked laser.

7. A method as recited in claim 6, wherein the coherent optical carrier is generated by phase locking the signal comb and the LO comb with a common frequency reference that is a continuous wave laser.

8. A Light Detection and Ranging (LIDAR) comprising:
a first mode locked laser which generates a signal comb that transmits a signal pulse train reflected from a reference and a target subject to a distance measurement relative the reference;
a second mode locked laser that generates a local oscillator (LO) comb;
a first continuous wave laser and a second continuous wave laser stabilized to an optical reference cavity, said first continuous wave laser phase locked at a first tooth of the signal comb and the LO comb, said second continuous wave laser phase locked at a second tooth of the signal comb and the LO comb different than the first tooth to relate a distance between the reference and the target to a known distance of said optical reference cavity;
a beamsplitter including first and second output ports, said beamsplitter being arranged to receive and combine said signal comb, or said LO comb with said first continuous wave laser and said second continuous wave laser and direct a first output from said first output port to said target; and
wherein said beamsplitter is arranged to direct a second output from said second output port to a 2-channel, optical filter with each channel centered on one of said continuous wave lasers.

9. A LIDAR as recited in claim 8, wherein the signal comb and the LO comb are phase locked with said first continuous wave laser such that their optical carriers are mutually coherent and phase locked with said second continuous wave laser such that their repetition rates have a slight, known difference.

10. A LIDAR as recited in claim 8, further comprising two detectors that are each operable to detect a beat signal between a respective one of said combs and a respective one of said continuous wave lasers.

11. A LIDAR as recited in claim 10, further comprising phaselock electronics arranged to receive said second output from said detectors and generate an error signal for feedback to said frequency combs.

12. A LIDAR as recited in claim 8, wherein said beamsplitter is a polarizing beamsplitter.

13. A LIDAR as recited in claim 12, wherein said beamsplitter is a polarization insensitive beamsplitter of any ratio with regard, respectively, to said first output and said second output.

* * * * *